United States Patent [19]
Yamazaki et al.

[11] Patent Number: 5,644,412
[45] Date of Patent: Jul. 1, 1997

[54] HOLOGRAM AND METHOD OF READING THE SAME

[75] Inventors: Satoshi Yamazaki; Ryuji Horiguchi, both of Tokyo, Japan

[73] Assignee: Dai Nippon Printing Co., Ltd., Tokyo, Japan

[21] Appl. No.: 191,619

[22] Filed: Feb. 4, 1994

Related U.S. Application Data

[63] Continuation-in-part of Ser. No. 996,800, Dec. 24, 1992, abandoned.

[30] Foreign Application Priority Data

Dec. 25, 1991 [JP] Japan ...................... 3-342566

[51] Int. Cl.$^6$ ...................................... G03H 1/00
[52] U.S. Cl. .................. 359/2; 359/32; 359/33; 235/457; 283/86
[58] Field of Search ...................... 359/2, 22, 25, 359/26, 32, 33; 356/71; 283/86, 904; 235/457

[56] References Cited

U.S. PATENT DOCUMENTS

| | | | |
|---|---|---|---|
| 3,506,327 | 4/1970 | Leith et al. | 359/23 |
| 3,578,845 | 5/1971 | Brooks | 359/15 |
| 3,580,655 | 5/1971 | Leith et al. | 359/28 |
| 3,758,186 | 9/1973 | Brumm | 359/12 |
| 4,108,367 | 8/1978 | Hannan | 359/2 |
| 4,269,473 | 5/1981 | Fluthmann et al. | 283/86 |
| 4,563,024 | 1/1986 | Blyth | 359/2 |
| 4,568,141 | 2/1986 | Antes | 359/2 |
| 4,589,686 | 5/1986 | McGrew | 283/85 |
| 4,820,006 | 4/1989 | Constant | 359/2 |
| 5,059,776 | 10/1991 | Antes | 359/2 |
| 5,300,764 | 4/1994 | Hoshino et al. | 359/2 |
| 5,306,899 | 4/1994 | Marom et al. | 359/2 |
| 5,351,142 | 9/1994 | Cueli | 359/2 |
| 5,444,225 | 8/1995 | Takahashi et al. | 235/457 |

FOREIGN PATENT DOCUMENTS

| | | | |
|---|---|---|---|
| 60-83074 | 5/1985 | Japan | 359/2 |
| 63-283384 | 12/1987 | Japan | 359/2 |
| 4-264582 | 9/1992 | Japan | 359/2 |
| 405174176 | 7/1993 | Japan | 235/457 |

*Primary Examiner*—Paul M. Dzierzynski
*Assistant Examiner*—John Juba, Jr.
*Attorney, Agent, or Firm*—Dellett and Walters

[57] ABSTRACT

A hologram which contains the record of a parallel bar-shaped pattern, like a bar code pattern, and which can be read with a single light-receiving element of simple structure with fewer restrictions on the installation position of the light-receiving element and with a minimal lowering in the read accuracy even if the light-receiving element is disposed a little out-of-position. Also disclosed is a method of reading such a hologram. A hologram is recorded in a region that extends in a direction intersecting each bar of a reconstructed bar-shaped pattern and that is not shorter than the length of the reconstructed bar-shaped pattern at least in the above-described direction. Alternatively, the hologram is recorded in a stripe region elongated at the above-described direction. The hologram is read by illuminating it with a reconstructing light beam of small diameter which illuminates only a limited portion of the recording region, receiving diffracted light from the hologram with a single light-receiving element at a position which is coincident with an imagery position where an image of the bar-shaped pattern is formed, or closer to the hologram than imagery position, and at which beams of diffracted light from the hologram are separate from each other, and moving the hologram relative to the reconstructing light beam and the single light-receiving element in a direction intersecting each bar of the reconstructed bar-shaped pattern.

9 Claims, 3 Drawing Sheets

HOLOGRAM AND METHOD OF READING THE SAME

This application is a continuation-in-part of application Ser. No. 07/996,800 filed Dec. 24, 1992 now abandoned.

BACKGROUND OF THE INVENTION

The present invention relates to a machine-readable hologram containing the record of a parallel bar-shaped pattern, like a bar code pattern, and also to a method of reading such a hologram. More particularly, the present invention relates to a hologram which can be readily read with a single light-receiving element by moving the hologram, and also to a method of reading such a hologram.

It is a known practice to record a bar code in the form of a hologram, reconstruct it by illumination with a laser beam for reconstruction, and read the reconstructed bar code with a line sensor or an image sensor (for example, see Japanese Patent Application Laid-Open (KOKAI) Nos. 62-283383 (1987), 62-283384 (1987), 62-283385 (1987), 63-61386 (1988), 63-168397 (1988), 63-206791 (1988), and 63-207696 (1988).

The prior art, which employs a line sensor or an image sensor to read a recorded bar code, suffers, however, from the problem that there are many restrictions on the installation position of the sensor. If the sensor is not disposed in the required position, particularly in terms of the direction of propagation of the diffracted light, the bar code read accuracy lowers.

In addition, it has not heretofore been practiced to read a recorded bar code with a single light-receiving element having a simple structure.

As another prior art, there is known an information reading method wherein a light beam is moved relative to a diffraction grating pattern formed in a bar code field, and diffracted light from each bar-shaped pattern is read, thereby reading information recorded in the form of a bar code (see U.S. Pat. No. 5,059,776). However, the conventional method involves a restriction on the relationship between the diameter of a light beam used for reading and the widths of bar-shaped patterns recorded. That is, as the spacing of bar code elements becomes smaller, the resolving power for reading degrades. In addition, since the recorded information can be seen directly in the form of a bar code, it is inferior in secrecy to information recorded in the form of a hologram.

SUMMARY OF THE INVENTION

In view of the above-described problems of the prior art, it is an object of the present invention to provide a hologram which contains the record of a parallel bar-shaped pattern, like a bar code pattern, and which can be read with a single light-receiving element of simple structure with fewer restrictions on the installation position of the light-receiving element and with a minimal lowering in the read accuracy even if the light-receiving element is disposed a little out-of-position, and also provides a method of reading such a hologram.

To attain the above-described object, the present invention provides a hologram recorded so as to reconstruct an image of a bar-shaped pattern including a plurality of parallel bars. The hologram is recorded in a region that extends in a direction intersecting each bar of the reconstructed bar-shaped pattern and that is not shorter than the length of the reconstructed bar-shaped pattern at least in the above-described direction.

In addition, the present invention provides a hologram recorded so as to reconstruct an image of a bar-shaped pattern including a plurality of parallel bars. The hologram is recorded in a stripe region elongated in a direction intersecting each of the reconstructed bar-shaped patterns.

In actual practice, the above-described holograms may be provided on cards.

In addition, the present invention provides a method of reading a hologram recorded so as to reconstruct an image of a bar-shaped pattern including a plurality of parallel bars, the hologram being recorded in a recording region extending in a direction intersecting each bar of the reconstructed bar-shaped pattern. The hologram is illuminated with a reconstructing light beam of small diameter which illuminates only a limited portion of the recording region, and diffracted light from the hologram is received with a single light-receiving element at a position which is coincident with an imagery position where an image of the bar-shaped pattern is formed, or closer to the hologram than the imagery position, and at which beams of diffracted light from the hologram are separate from-each other. Further, the hologram is moved relative to the reconstructing light beam and the single light-receiving element in a direction intersecting each bar of the reconstructed bar-shaped pattern, thereby reading the recorded bar-shaped pattern.

In actual practice, the hologram may be provided on a card.

In the present invention, the hologram is recorded in a region that extends in a direction intersecting each bar of the reconstructed bar-shaped pattern and that is not shorter than the length of the reconstructed bar-shaped pattern at least in the above-described direction. Alternatively, the hologram is recorded in a stripe region elongated in a direction intersecting each bar of the reconstructed bar-shaped pattern. The hologram is read by illuminating the hologram with a reconstructing light beam of small diameter which illuminates only a limited portion of the recording region, receiving diffracted light from the hologram with a single light-receiving element at a position which is coincident with an imagery position where an image of the bar-shaped pattern is formed, or closer to the hologram than the imagery position, and at which beams of diffracted light from the hologram are separate from each other, and moving the hologram relative to the reconstructing light beam and the single light-receiving element in a direction intersecting each bar of the reconstructed bar-shaped pattern, thereby reading the recorded bar-shaped pattern. Accordingly, the bar-shaped pattern can be read effectively with a single light-receiving element of simple structure without the need to increase the diameter of the reconstructing light beam, with fewer restrictions on the installation position of the light-receiving element, and with a minimal lowering in the read accuracy even if the light-receiving element is a little out-of-position.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

The principles and embodiments of the hologram and the hologram reading method according to the present invention will be described below with reference to the accompanying drawings.

Figure 1:
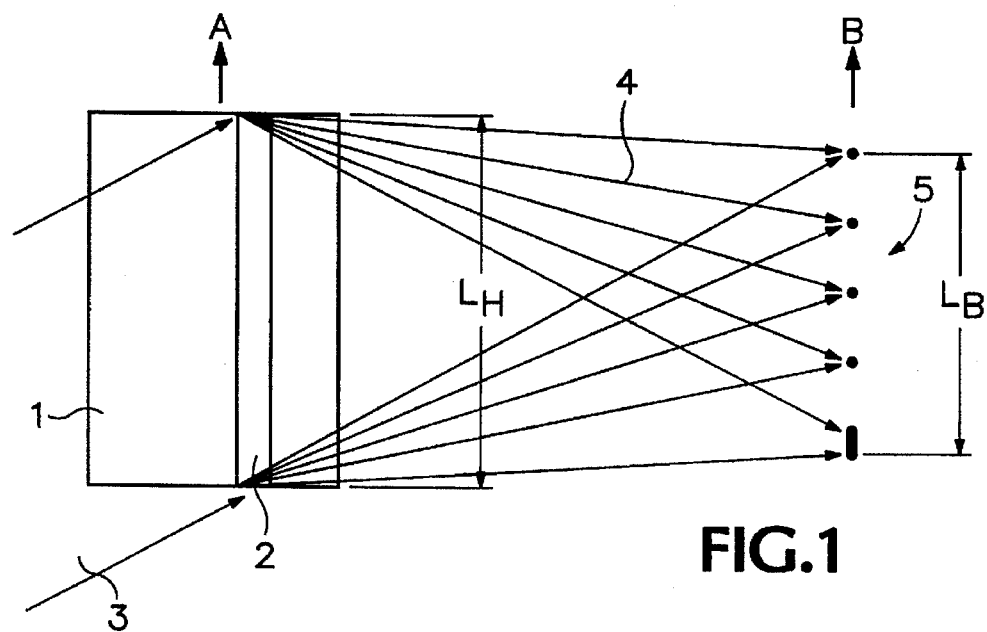
FIG. 1 is a plan view showing the way in which a bar code pattern is reconstructed from a card provided with a hologram according to the present invention.

FIG. 1 is a plan view showing the way in which a bar code pattern 5 is reconstructed by diffracted light 4 when reconstructing light 3 is applied to a hologram 2 according to the present invention, which is provided on a stripe region of a card 1 that extends parallel to the direction of travel of the card 1, as shown by the arrow in the figure. The reconstructing light 3 is obliquely incident on the hologram 2 from the bottom left corner toward the top right corner as viewed in the figure at an angle to the plane of the figure. The reconstructed bar code pattern 5 comprises a plurality of parallel bar-shaped patterns extending perpendicularly to the plane of the figure. The length $L_B$ of the bar code pattern 5 is set so as to be not greater than the length $L_H$ of the hologram 2 in the same direction. As the card 1, which is provided with the hologram 2, is moved relative to the reconstructing light 3 in the direction of the arrow A shown in the figure, the reconstructed bar code pattern 5 also moves in the direction of the arrow B, which is the same as the direction of the arrow A. It should be noted that the hologram 2 may comprise a plurality of tracks containing the record of bar code patterns extending perpendicularly to the feed direction of the hologram 2. Alternatively, the hologram 2 may contain the record of a plurality of bar code patterns which are superimposed one upon another so as to be reconstructed at different positions.

Figure 2:
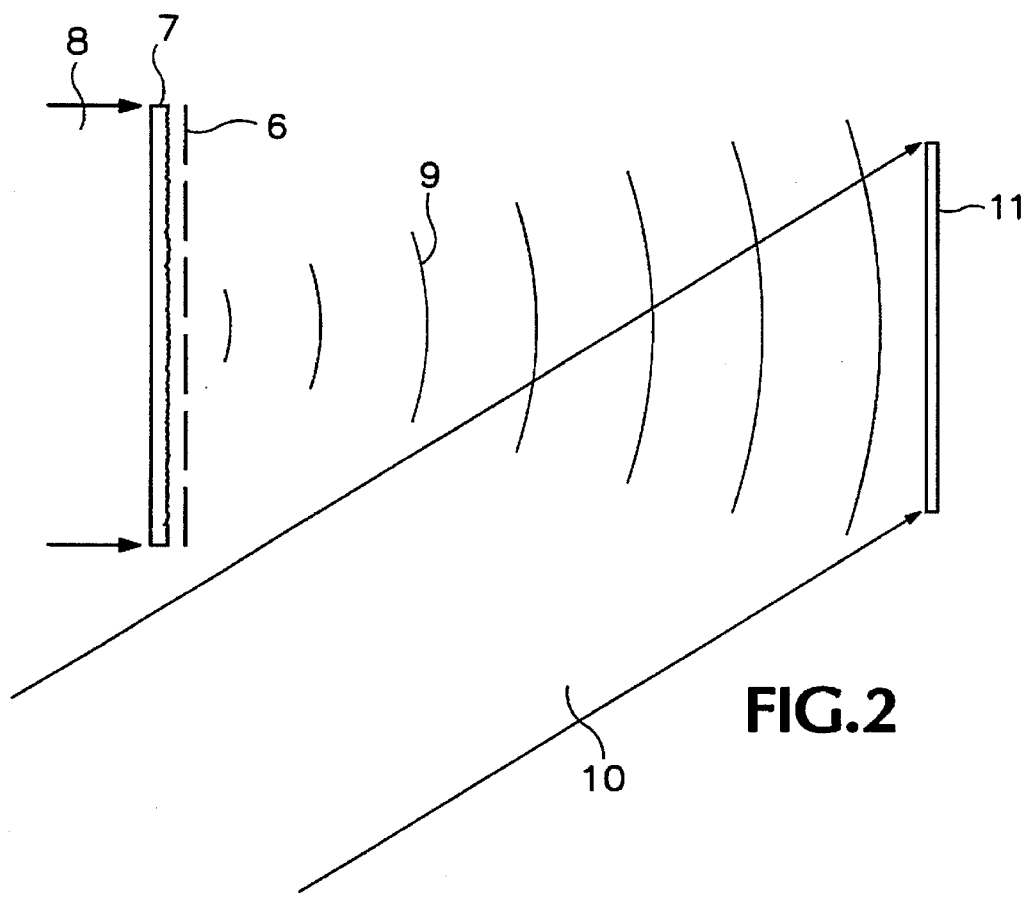
FIG. 2 shows an optical arrangement for photographically recording the hologram shown in FIG. 1.

The hologram containing the record of the bar code pattern 5 may be photographically recorded by an optical arrangement such as that shown in FIG. 2, which illustrates exemplarily the way of photographically recording a Fresnel hologram, which is the most common type of hologram. That is, illuminating light 8 is applied through a diffuser 7 to a mask 6 having a plurality of parallel bar-shaped openings extending perpendicularly to the plane of the figure, and object light 9 from the mask 6 and a parallel beam of reference light 10 are allowed to interfere with each other on a photosensitive material 11, thereby recording the resulting interference fringe pattern. Then, the photosensitive material 11 having the record of the interference fringe pattern is developed to obtain a hologram. The hologram thus obtained is cut in parallel to the plane of the figure into a stripe-shaped piece, which is then attached to a card 1, thereby obtaining the card 1 as shown in FIG. 1.

The hologram 2, which is photographically recorded with the optical arrangement as shown in FIG. 2 so as to reconstruct a bar code pattern 5 such as that shown in FIG. 1, has redundancy of the hologram whereby the whole bar code pattern 5 is reconstructed with the positional relationship between the hologram recording region and the mask 6 established at the time of the photographic recording no matter which minute recording region of the hologram 2 is partially illuminated during the reconstruction.

Figure 3:
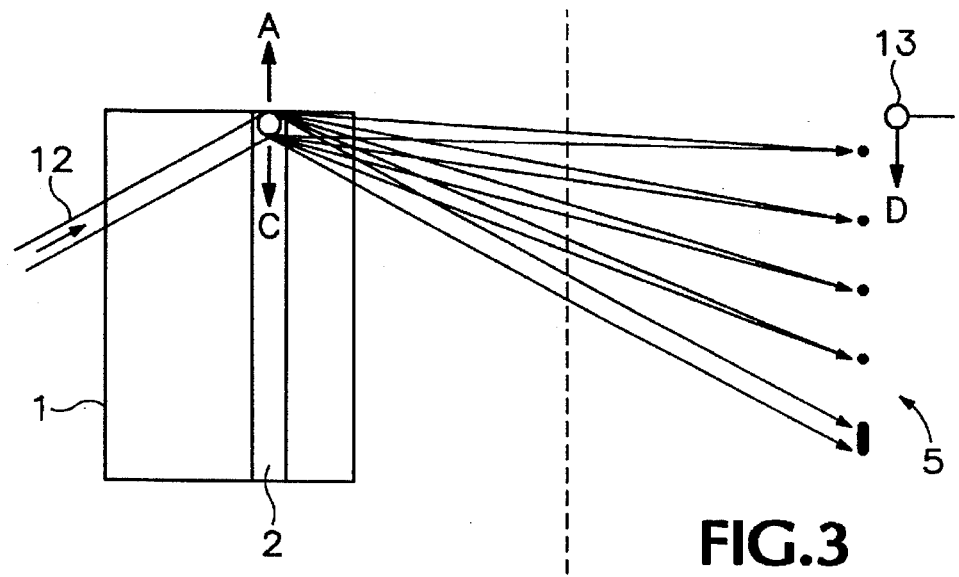
FIG. 3 shows an optical arrangement for carrying out one embodiment of the hologram reading method according to the present invention.
Figure 4:
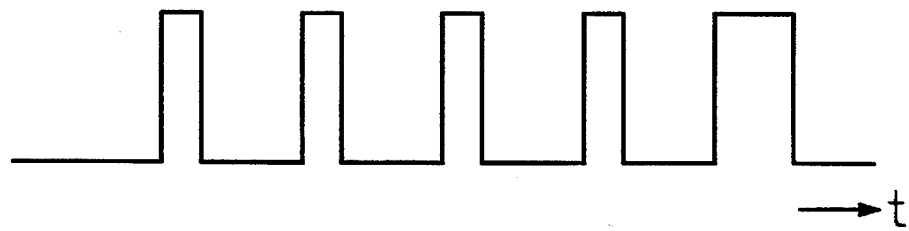
FIG. 4 shows a waveform of a read signal obtained by the reading method shown in FIG. 3.

The method of reading the bar code pattern 5 from the hologram 2 such as that shown in FIG. 1 will be explained below. The bar code pattern 5 can be read with a line sensor or an image sensor which is disposed at the position of the reconstructed bar code pattern 5, as shown in FIG. 1. However, in the present invention, a single light-receiving element 13 is disposed at the position where the bar code pattern 5 is reconstructed, and the hologram 2 is reconstructed by using a beam of reconstructing light 12 having a small beam diameter, as shown in FIG. 3, thereby reading the bar code pattern 5 even more simply. Further, the card 1 is moved in the direction of the arrow A relative to the light-receiving element 13 and the reconstructing light beam 12 in a direction intersecting perpendicularly to each bar of the bar code. Consequently, the hologram illuminating region of the reconstructing light beam 12 and the light-receiving element 13 move at the same speed relative to the card 1 in the direction opposite to the direction A of movement of the card 1, as shown by the arrows C and D in FIG. 3. Accordingly, a read signal having a waveform such as that shown in FIG. 4 is obtained from the light-receiving element 13. Thus, by moving the card 1 in a direction intersecting the recorded bar-shaped patterns, with a single light-receiving element 13 disposed where the bar code pattern 5 is reconstructed, the bar code pattern 5 can be read with ease. In addition, if the length $L_H$ of the hologram region is not shorter than the length $L_B$ of the bar code pattern 5, even if the light-receiving element 13 is fixed, all the bar code pattern 5 can be read by moving the card 1 only, which is favorable for the arrangement of a read device.

This point will be explained below more specifically. The fact that the length $L_B$ of the reconstructed bar code pattern 5 is shorter than the length $L_H$ of the recording region of the hologram 2 in the direction A means that when the hologram 2 is moved in the direction A relative to the fixed light source (not shown) of the reconstructing light beam 12 and the fixed light-receiving element 13, the length of time that the light-receiving element 13 receives the light of the reconstructed image 5 of the hologram 2 is shorter than the length of time that the reconstructing light beam 12 from the light source illuminates the recording region of the hologram 2.

Accordingly, by properly selecting a positional relationship between the light source, the light-receiving element 13 and the hologram 2, it is possible to realize an arrangement wherein when the reconstructing light beam 12 is being applied to one end of the hologram 2, the light-receiving element 13 receives no light of the reconstructed image, for example, as shown in FIG. 3. Thus, the bar code 5 as the reconstructed image can be accurately read at all times without a read error.

In contrast, if the length $L_B$ of the bar code image 5 of the hologram 2 in the direction A is longer than the length $L_H$ of the recording region of the hologram 2 in the direction A, the bar code 5 cannot satisfactorily be read unless an effective length traveled by the light-receiving element 13 is longer than the length of the recording region as traveled by the illuminating light 12. However, because the light-receiving element 13 and light source are fixed, the light-receiving element 13 is unable to travel an effective length greater than the length $L_H$ of the recording region. Accordingly, a part of the bar code 5 fails to be read by the light-receiving element 13 in actual practice because the length $L_B$ of bar code image 5, which is a reconstructed image of the hologram 2 as reconstructed by the illuminating light beam 12, is longer than the length $L_H$ of the recording region of the hologram 2 available for effective travel by the illuminating light beam 12. Therefore, such an arrangement is unsuitable for reading.

If the length $L_H$ of the recording region of the hologram 2 in the direction A is the same as the length $L_B$ of the bar code image 5 of the hologram 2 in the direction A, the bar code 5 must be read even when the reconstructing light beam 12 is being applied to one end of the hologram 2, as shown in FIG. 3, incidentally, when the illuminating light beam 12 is applied to one end of the hologram 2, since the hologram 2 moves relative to the light source and the light-receiving element 13, the area of illumination gradually changes from zero to the cross-sectional area of the reconstructing light beam 12, or vice versa. Accordingly, the light intensity of the bar code image 5, which is reconstructed from the hologram 2 having redundancy, also gradually changes. Since binary information, e.g. a bar code, is generally read on the basis of a predetermined threshold value, if binary information to be read has a part where the light intensity gradually changes, it is difficult to read it accurately. Therefore, the arrangement in which the length $L_H$ of the hologram 2 and the length $L_B$ of the bar code 5 are equal to each other is not always suitable for reading.

Accordingly, it will be understood from the foregoing discussion that it is preferable from the viewpoint of the stability of the intensity of read light that a length obtained by subtracting the diameter of the reconstructing light beam 12 from the length $L_H$ of the recording region of the hologram 2 is not shorter than the length $L_B$ of the bar code image 5.

It should be noted that in a case where a bar code is recorded in the form of not a hologram but a diffraction grating pattern as in U.S. Pat. No. 5,059,776, the intensity of diffracted light is proportional to the intensity of illuminating light. However, the diffraction grating has no redundancy, and the illuminating light beam generally has a circular or elliptical cross-section. Therefore, the intensity of diffracted light from each bar-shaped pattern of the bar code changes. Accordingly, the bar code recorded in the form of a diffraction grating pattern is unsuitable for reading information accurately for the same reason as that in the case where the length $L_H$ of the hologram 2 and the length $L_B$ of the bar code 5 are equal to each other.

Incidentally, in the case of the above-described Fresnel hologram, the position where the bar code pattern 5 of the hologram 2 is reconstructed is relatively distant from the card 1. Accordingly, if a read device is arranged according to the layout as shown in FIG. 3, the size of the device increases because the position of the light-receiving element 13 is relatively distant from the card 1. However, if the reconstructing light 12 is a beam having a small diameter, the single light-receiving element 13 does not necessarily need to be disposed at the position where the bar code pattern 5 is reconstructed. In other words, even if the light-receiving element 13 is disposed closer to the card 1, for example, at a position shown by the chain line in FIG. 3, the recorded bar code can be read satisfactorily. The reason for this will be explained below with reference to FIGS. 5 to 7. Since the hologram 2 has high redundancy, even if the region illuminated with the reconstructing light beam 12 is small, all the bar code pattern 5 can be reconstructed.

Figure 5:
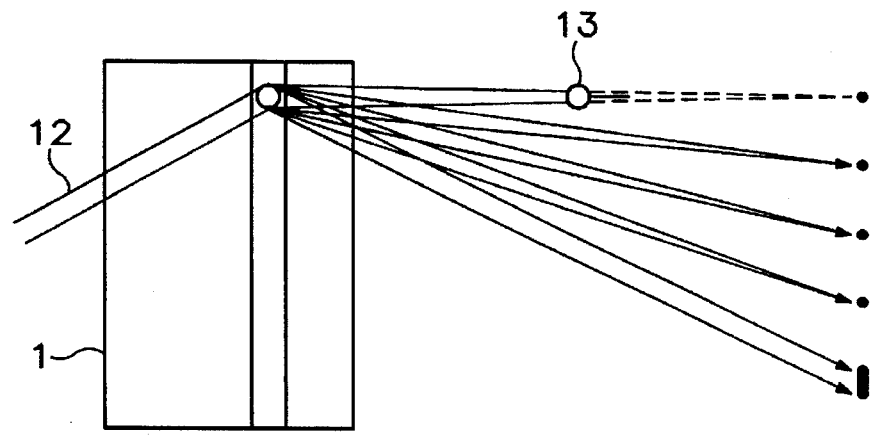
FIG. 5 shows an optical arrangement for carrying out another embodiment of the hologram reading method according to the present invention, and the relationship between a beam of diffracted light and a light-receiving element at a specific position.
Figure 6:
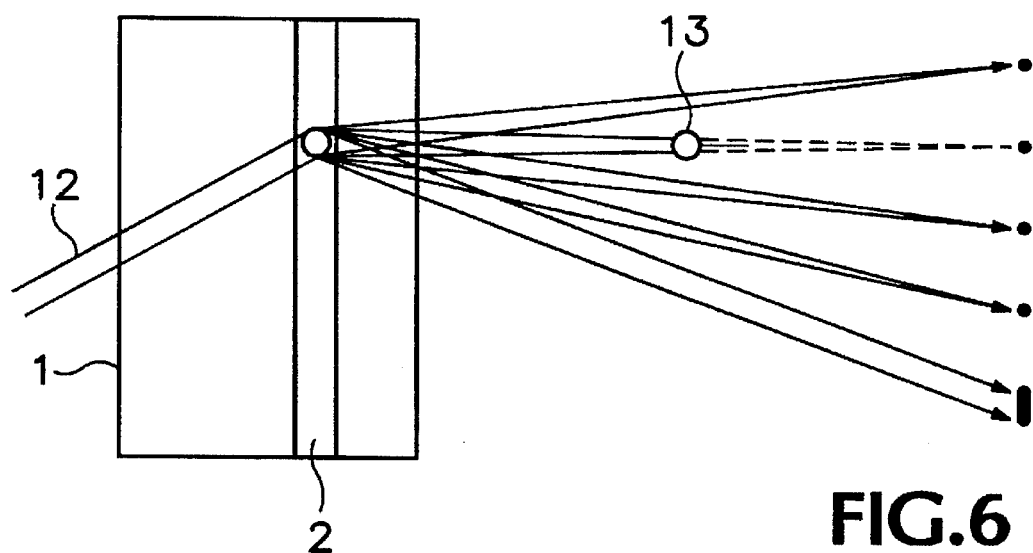
FIG. 6 is a view similar to FIG. 5 showing the relationship between a beam of diffracted light and the light-receiving element at another position.
Figure 7:
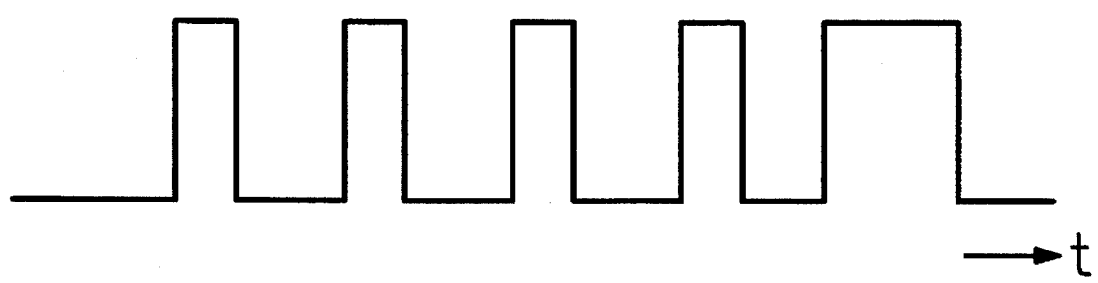
FIG. 7 shows a waveform of a read signal obtained by the second embodiment of the present invention.

However, light beams which are diffracted by the hologram 2 to travel toward the respective bar patterns are separate from each other even at a position relatively close to the card 1, as will be clear from FIGS. 5 and 6. Accordingly, if the single light-receiving element 13 is disposed at a position which is closer to the card 1 than the position where the bar code pattern 5 is reconstructed, and at which the diffracted light beams are separate from each other, a read signal such as that shown in FIG. 7 is obtained from the light-receiving element 13, as will be clear from the card read position that shifts from the position shown in FIG. 5 to the position shown in FIG. 6, for example. It will be understood from a comparison between the signals shown in FIGS. 7 and 4 that if the light-receiving element is disposed closer, the width of the rectangular read signal representative of each bar-shaped pattern is relatively large, but the position of the signal is the same as that of the signal obtained with the arrangement shown in FIG. 3. Therefore, the bar code pattern 5 can be read satisfactorily with the light-receiving element 13 disposed closer to the card 1. It should be noted that as the diameter of the reconstructing light beam 12 decreases, the width of the rectangular signal decreases, and hence the light-receiving element 13 can be disposed closer to the card 1.

On the other hand, if the illuminating region of the reconstructing illuminating light 3 applied to the hologram 2 is relatively large as in the case of FIG. 1, beams of diffracted light 4 do not satisfactorily separate from each other until they reach the vicinity of a position where the diffracted light 4 forms an image of the bar code pattern 5. Accordingly, if a single light-receiving element 13 is disposed closer to the card 1 than the position where the bar code pattern 5 is reconstructed, as described above, each bar code element cannot distinctively be read.

Thus, by reading the bar code pattern 5 by illumination with the reconstructing light beam 12 having a small diameter, with the single light-receiving element 13 disposed at a position closer to the card 1 than the position where the bar code pattern 5 is constructed, the read device can be arranged with a reduced size.

The above-described hologram and hologram reading method can be used for various purposes, for example, as a hologram containing the record of a bar code, and a method of reading the hologram. Such a hologram may be attached to a part or the whole surface of various kinds of card, e.g. bank credit cards, prepaid cards, etc., and used as secret information. Further, it should be noted that the present invention is not necessarily limited to the above-described embodiments and that various changes and modifications may be imparted thereto.

The Fresnel hologram, which is employed in the present invention, is preferably recorded in the form of relief dimple patterns, because with this recording form a large number of holograms can be duplicated at relatively low cost and, further, the angle of incidence of reconstructing light applied to reconstruct the hologram image is less dependent on the angle of incidence of reference light applied during the photographic recording of the hologram. To record a hologram in the form of relief dimple patterns, a photoresist, for example, Bichroposit 1300, available from Supray (U.S.A.), or OFPR, available from Tokyo Applied Chemistry Co., Ltd., may be used as a photosensitive material. On the photosensitive material, a distribution of light intensities corresponding to interference fringes produced by interference between object light and reference light is recorded in the form of relief dimple patterns, thereby forming a relief hologram. Then, the relief surface is plated with nickel, for example, to produce a relief stamper, with which an embossed hologram is duplicated by a known method. Then, Al, ZnS or TiO$_2$ is deposited on the dimple pattern surface of the duplicate to form a reflecting layer, thereby obtaining the desired hologram.

As will be clear from the foregoing description, according to the present invention, the hologram is recorded in a region that extends in a direction intersecting each bar of the reconstructed bar-shaped pattern and that is not shorter than the length of the reconstructed bar-shaped pattern at least in the above-described direction. Alternatively, the hologram is recorded in a stripe region elongated in a direction intersecting each bar of the reconstructed bar-shaped pattern. The hologram is read by illuminating the hologram with a reconstructing light beam of small diameter which illuminates only a limited portion of the recording region, receiving diffracted light from the hologram with a single light-receiving element at a position which is coincident with an imagery position where an image of the bar-shaped pattern is formed, or closer to the hologram than the imagery position, and at which beams of diffracted light from the hologram are separate from each other, and moving the hologram relative to the reconstructing light beam and the single light-receiving element in a direction intersecting each bar of the reconstructed bar-shaped pattern, thereby reading the recorded bar-shaped pattern. Accordingly, the bar-shaped pattern can be read effectively with a single light-receiving element of simple structure without the need to increase the diameter of thereconstructing light beam, with fewer restrictions on the installation position of the light-receiving element, and with minimal lowering in the read accuracy even if the light-receiving element is a little out-of-position.

We claim:

1. A hologram having a record for reconstructing a like image of a plurality of parallel bars of a given sequence from each area of said hologram by illumination with a beam of light of a diameter less than a length of a region of said hologram record, said region extending parallel to an axis that intersects the bars of the reconstructed pattern, and the length of the region being at least as long as the reconstructed pattern in a direction parallel to said axis so that as said hologram receives reconstructing light of a stationary light source and said hologram is moved the length of said region in said direction, the complete sequence of said pattern passes over a selected fixed point in a stationary receiving position.

2. A hologram according to claim 1, which is provided on a card.

3. A hologram according to claim 1, which is recorded in a stripe region elongated in a direction intersecting each of the reconstructed bar-shaped patterns.

4. A hologram according to claim 3, which is provided on a card.

5. A method of reading a hologram having a recorded pattern sequence so as to reconstruct a like image of a plurality of parallel bars of the pattern sequence from each area of said hologram by illumination with a beam of light having a diameter less than a length of an elongate recording region of said hologram, said elongate recording region extending parallel to an axis that intersects the bars of the reconstructed like image, said method comprising:

illuminating said hologram with a reconstructing light beam which illuminates only a limited portion of the length of said recording region;

receiving diffracted light from said hologram with a single light-receiving element at a receiving position, the receiving position being at least coincident with or closer to said hologram than an imagery position at which beams of diffracted light from said hologram reconstructing the like image of a plurality of parallel bars converge to a real image; and moving said hologram relative to said reconstructing light beam and said single light-receiving element in a direction parallel to said axis, thereby reading the recorded pattern sequence.

6. A hologram reading method according to claim 5 wherein said hologram is provided on a card, and said hologram is read by moving said card.

7. A method of reading a hologram according to claim 5 wherein said receiving position for receiving the diffracted light from said hologram is closer to said hologram than the imagery position.

8. A method of reading a hologram according to claim 5 wherein said receiving position for receiving the diffracted light from said hologram is coincident with the imagery position.

9. A hologram having a record for reconstructing a like image of a plurality of parallel bars of a given sequence from each area of said hologram by illumination with a beam of light of a diameter less than a length of a region of said hologram record, said region extending parallel to an axis that intersects the bars of the reconstructed pattern, and the length of the region being at least as long as the reconstructed pattern in a direction parallel to said axis so that as said hologram receives reconstructing light of a fixed light source and said hologram is moved the length of said region in said direction, the complete sequence of said pattern passes over a selected fixed point in a stationary receiving position, and the receiving position being positioned closer to said hologram than an imagery position at which beams of diffracted light from said hologram reconstructing the like image have converged with each other.

* * * * *